US009679012B1

(12) United States Patent
Dorin et al.

(10) Patent No.: US 9,679,012 B1
(45) Date of Patent: Jun. 13, 2017

(54) PARALLEL STREAMING OF EXTERNAL DATA

(71) Applicant: Pivotal Software, Inc., Palo Alto, CA (US)

(72) Inventors: Dov Yaron Dorin, Ramat Gan (IL); Alon Goldshuv, Tel Aviv (IL); Noa Horn, Jerusalem (IL); Alex Shacked, Ramat HaSharon (IL)

(73) Assignee: Pivotal Software, Inc., San Francisco, CA (US)

( * ) Notice: Subject to any disclaimer, the term of this patent is extended or adjusted under 35 U.S.C. 154(b) by 127 days.

(21) Appl. No.: 14/194,451

(22) Filed: Feb. 28, 2014

(51) Int. Cl.
*G06F 17/30* (2006.01)

(52) U.S. Cl.
CPC .............................. *G06F 17/30469* (2013.01)

(58) Field of Classification Search
CPC ............... G06F 17/2258; G06F 17/272; G06F 17/30516; G06F 17/30224; G06F 17/30445; G06F 17/30982; G06F 17/30094; G06F 17/30174; G06F 17/30194; G06F 17/30283; G06F 17/30566; G06F 17/30575; G06F 17/30469
USPC ........................................................ 707/718
See application file for complete search history.

(56) References Cited

U.S. PATENT DOCUMENTS

| | | | |
|---|---|---|---|
| 5,740,423 A * | 4/1998 | Logan ............... | G06F 17/30566 |
| 7,047,395 B2 | 5/2006 | Rosner et al. | |
| 7,110,353 B1 * | 9/2006 | Deschaine .......... | H04L 49/1523 370/219 |
| 7,548,898 B1 * | 6/2009 | Tarenskeen .......... | G06F 17/303 |
| 7,650,331 B1 | 1/2010 | Dean et al. | |
| 7,921,416 B2 * | 4/2011 | Fontoura ........... | G06F 17/30427 707/623 |
| 8,209,664 B2 * | 6/2012 | Yu ........................ | H04L 12/44 717/119 |
| 8,924,269 B2 | 12/2014 | Seubert et al. | |
| 9,491,239 B2 | 11/2016 | Kipp et al. | |
| 2004/0181523 A1 * | 9/2004 | Jardin ............... | G06F 17/30498 |

(Continued)

OTHER PUBLICATIONS

T. K. Sellis, "Multiple-query optimization," ACM TODS, 13(1):23-52, 1988, 40 pages.

(Continued)

*Primary Examiner* — Syed Hasan
*Assistant Examiner* — Saba Ahmed
(74) *Attorney, Agent, or Firm* — Fish & Richardson P.C.

(57) ABSTRACT

Methods, systems, and apparatus, including computer programs encoded on computer storage media, for streaming external data in parallel from a second distributed system to a first distributed system. One of the methods includes receiving a query that requests a join of first rows of a first table in a first distributed system with second rows of an external table, the external table representing data in a second distributed system. Each of the segment nodes communicates with a respective extension service that obtains fragments from one or more data nodes of the second distributed system according to location information for the respective fragments, and provides to the segment node a stream of data corresponding to second rows of the external table. Each of the segment nodes computes joined rows between the first rows of the first table and the stream of data corresponding to second rows of the external table.

21 Claims, 9 Drawing Sheets

(56) References Cited

U.S. PATENT DOCUMENTS

| | | |
|---|---|---|
| 2004/0186832 A1* | 9/2004 | Jardin ............... G06F 17/30498 |
| 2005/0187977 A1* | 8/2005 | Frost ................ G06F 17/30584 |
| 2008/0021925 A1 | 1/2008 | Sweeney |
| 2008/0168135 A1 | 7/2008 | Redlich |
| 2009/0254572 A1 | 10/2009 | Redlich et al. |
| 2010/0064166 A1 | 3/2010 | Dubnicki et al. |
| 2010/0069035 A1 | 3/2010 | Johnson et al. |
| 2010/0241827 A1* | 9/2010 | Yu ......................... H04L 12/44 712/30 |
| 2011/0314019 A1* | 12/2011 | Jimenez Peris ....... G06F 9/5066 707/737 |
| 2012/0066206 A1* | 3/2012 | Chappell ........... G06F 17/30445 707/713 |
| 2012/0094956 A1 | 4/2012 | Chandraratna |
| 2012/0197868 A1* | 8/2012 | Fauser .............. G06F 17/30286 707/714 |
| 2012/0254597 A1 | 10/2012 | Delling et al. |
| 2012/0317093 A1 | 12/2012 | Teletia et al. |
| 2015/0039442 A1* | 2/2015 | Sidman ............. G06F 17/30899 705/14.66 |

OTHER PUBLICATIONS

S. Harizopoulos et al., "Qpipe: A simultaneously pipelined relational query engine", in Proc. SIGMOD'05, 2005, 12 pages.

* cited by examiner

PARALLEL STREAMING OF EXTERNAL DATA

BACKGROUND

This specification relates to distributed databases.

Massive distributed databases include tables that are partitioned across multiple storage devices, in which each partition stores a subset of rows or columns of a particular table. Different distributed databases can store data in differing formats and file systems.

SUMMARY

This specification describes how a first distributed system can use an extension service to stream data in parallel from a second distributed system. In doing so, the extension service acts as a parallel interface between two distributed systems. The extension services can convert data as the data is streamed from the second distributed system. In addition, the extension service allows a first distributed system to perform joins and other query operations on data that is actually stored in the second distributed system. An extension service can also apply query predicates at scan time by returning only data from a second distributed system that satisfies a query predicate.

In general, one innovative aspect of the subject matter described in this specification can be embodied in methods that include the actions of receiving, by a first distributed system, a query that requests rows of an external table representing data stored in a second distributed system, wherein the second distributed system is distinct from the first distributed system, and wherein the second distributed system stores data in a second format that is different from a first format of data stored by the first distributed system; obtaining location information for a plurality of fragments of data in the second distributed system represented by the external table; allocating a portion of data in the external table to each of a plurality of segment nodes, including providing each segment node with location information for respective fragments of the plurality of fragments; receiving, by each of the plurality of segment nodes, a stream of converted data in the first format, wherein each segment node communicates with a respective extension service that obtains fragments in the second format from one or more data nodes of the second distributed system according to the location information for the respective fragments, converts the obtained fragments from the second format to the first format, and provides to the segment node a stream of converted data corresponding to the rows of the external table; and computing a result for the received query using the stream of converted data corresponding to the rows of the external table. Other embodiments of this aspect include corresponding computer systems, apparatus, and computer programs recorded on one or more computer storage devices, each configured to perform the actions of the methods. For a system of one or more computers to be configured to perform particular operations or actions means that the system has installed on it software, firmware, hardware, or a combination of them that in operation cause the system to perform the operations or actions. For one or more computer programs to be configured to perform particular operations or actions means that the one or more programs include instructions that, when executed by data processing apparatus, cause the apparatus to perform the operations or actions.

The foregoing and other embodiments can each optionally include one or more of the following features, alone or in combination. Obtaining location information for a plurality of fragments of data occurs after receiving the query. The extension service converts the obtained fragments to the first format at scan time. The location information includes a network location for a data node for each fragment of the plurality of fragments. The actions include receiving, from a user, a definition of the external table representing the fragments of data in the second distributed system. The second distributed system is a NoSQL database. The first format is a row-oriented format and wherein the second format is a column-oriented format. Each segment node computes a partial result for the query without storing the stream of converted data corresponding to the rows of the external table in nonvolatile memory of the first distributed system. Each extension service converts the data from the second format to the first format after receiving the query and before computing a result for the received query.

In general, another innovative aspect of the subject matter described in this specification can be embodied in methods that include the actions of receiving, by a first distributed system, a query that requests a join of first rows of a first table stored by a first distributed system with second rows of an external table, the external table representing data stored in a second distributed system, wherein the second distributed system is distinct from the first distributed system obtaining location information for a plurality of fragments of data in the second distributed system represented by the external table; allocating a portion of data in the external table to each of a plurality of segment nodes, including providing each segment node with location information for respective fragments of the plurality of fragments; receiving, by each of the plurality of segment nodes, a stream of data, wherein each segment node communicates with a respective extension service that obtains fragments from one or more data nodes of the second distributed system according to the location information for the respective fragments, and provides to the segment node a stream of data corresponding to second rows of the external table; computing, by each of the plurality of segment nodes, joined rows between the first rows of the first table and the stream of data corresponding to second rows of the external table; and computing a result for the received query using the joined rows. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. Obtaining the location information for the plurality of fragments occurs after receiving the query. The second distributed system stores the fragments in a second format that is different from a first format of the first table in the first distributed system. The second distributed system is a NoSQL database. The first format is a row-oriented format, and the second format is a column-oriented format. Each extension service converts the data from the first format to the second format after receiving the query and before computing a result for the received query. Each segment node generates joined rows without storing the stream of data corresponding to the second rows of the external table in a database of the first distributed system. Each segment node generates joined rows without storing the stream of data corresponding to the second rows of the external table in nonvolatile memory. At least two segment nodes compute joined rows in parallel from respective streams of data from the data nodes of the second distributed system.

In general, another innovative aspect of the subject matter described in this specification can be embodied in methods that include the actions of receiving, by a first distributed system, a query that requests rows of data of an external table representing data stored in a second distributed system, wherein the second distributed system is distinct from the first distributed system; obtaining statistics of the data stored in the second distributed system represented by the external table; evaluating a plurality of query plans using one or more cost criteria, including computing a cost associated with each of the query plans, wherein the cost criteria includes a scanning cost of reading the data stored in the second distributed system based on the statistics; selecting a query plan from the plurality of query plans based at least in part on the cost associated with each of the query plans; and computing a result for the received query according to the selected query plan. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. Obtaining statistics of the data stored in the second distributed system represented by the external table comprises obtaining a number of fragments, rows, or blocks of data stored on the external system. Computing a cost associated with each of the query plans comprises using different cost criteria for scanning internal tables of data stored on the first distributed system than scanning external tables representing data stored on the second distributed system. The one or more cost criteria include a measure of network bandwidth between the first distributed system and the second distributed system. The second distributed system stores fragments of data in a second format that is different from a first format of a first table in the first distributed system. The second distributed system is a NoSQL database. The actions include receiving the statistics from an analyzer of an extension service; and storing the statistics in a system catalog for use by a query planner.

In general, another innovative aspect of the subject matter described in this specification can be embodied in methods that include the actions of receiving, by a first distributed system, a query that requests rows of an external table representing data stored in a second distributed system, wherein the second distributed system is distinct from the first distributed system, and wherein the query includes a predicate that specifies a condition on an attribute of the requested rows of the external table; providing the predicate to a plurality of segment nodes; receiving, by each of the plurality of segment nodes, filtered data corresponding to the rows of the external table, wherein each segment node provides the predicate to an extension service that obtains fragments from one or more data nodes of the second distributed system, determines whether each fragment has an attribute that satisfies the predicate, and provides, to the segment node, filtered data comprising the fragments from the second distributed system having the attribute satisfied by the predicate; and computing a result for the received query using the filtered data corresponding to the rows of the external table. Other embodiments of this aspect include corresponding computer systems, apparatus, and computer programs recorded on one or more computer storage devices, each configured to perform the actions of the methods.

The foregoing and other embodiments can each optionally include one or more of the following features, alone or in combination. The actions include generating a query plan that includes a scan operation of the external table, wherein the scan operation applies the predicate of the query to rows of the external table; and providing the query plan to each of the plurality of segment nodes, wherein each segment node performs the scan operation on the external table specified by the query plan by providing the predicate to an extension service. The predicate specifies a value of an attribute of the external table. Each extension service obtains the fragments from the second distributed system after receiving the query and before a query result is computed. Each segment node computes a partial result for the query without storing the filtered data in nonvolatile memory of the first distributed system. The actions include obtaining location information for a plurality of fragments of data in the second distributed system represented by the external table; allocating a portion of data in the external table to each of a plurality of segment nodes, including providing each segment node with location information for respective fragments of the plurality of fragments.

Particular embodiments of the subject matter described in this specification can be implemented so as to realize one or more of the following advantages. Multiple extension services can stream data in parallel from a second distributed system, resulting in a fast and scalable scanning of data in a second distributed system. The data in the second distributed system need not be stored on the first distributed system in a converted format in order to be used by the first distributed system. The first distributed system can perform joins and other database operations without first converting and materializing the data on the first distributed system. The extension service provides an extensible framework that can be adapted by developers for any types of data formats on any appropriate distributed system. Thereafter, users of the first distributed system need not be familiar with the details of how the data is stored on the second distributed system. An analyzer of the extension service can provide a query planner with statistics about the data stored in the second distributed system so that the query planner can make informed decisions about efficient query plans that involve scanning data from the second distributed system. The extension service can read and return only attributes that are requested by the query, which results in faster scan times and saves network bandwidth. The system can push query predicates to an extension service, and the extension service can apply the query predicate at scan time. Applying the query predicate at scan time reduces the amount of data that must be transferred, saving network bandwidth and reducing the time required to compute a result for the query.

The details of one or more embodiments of the subject matter of this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
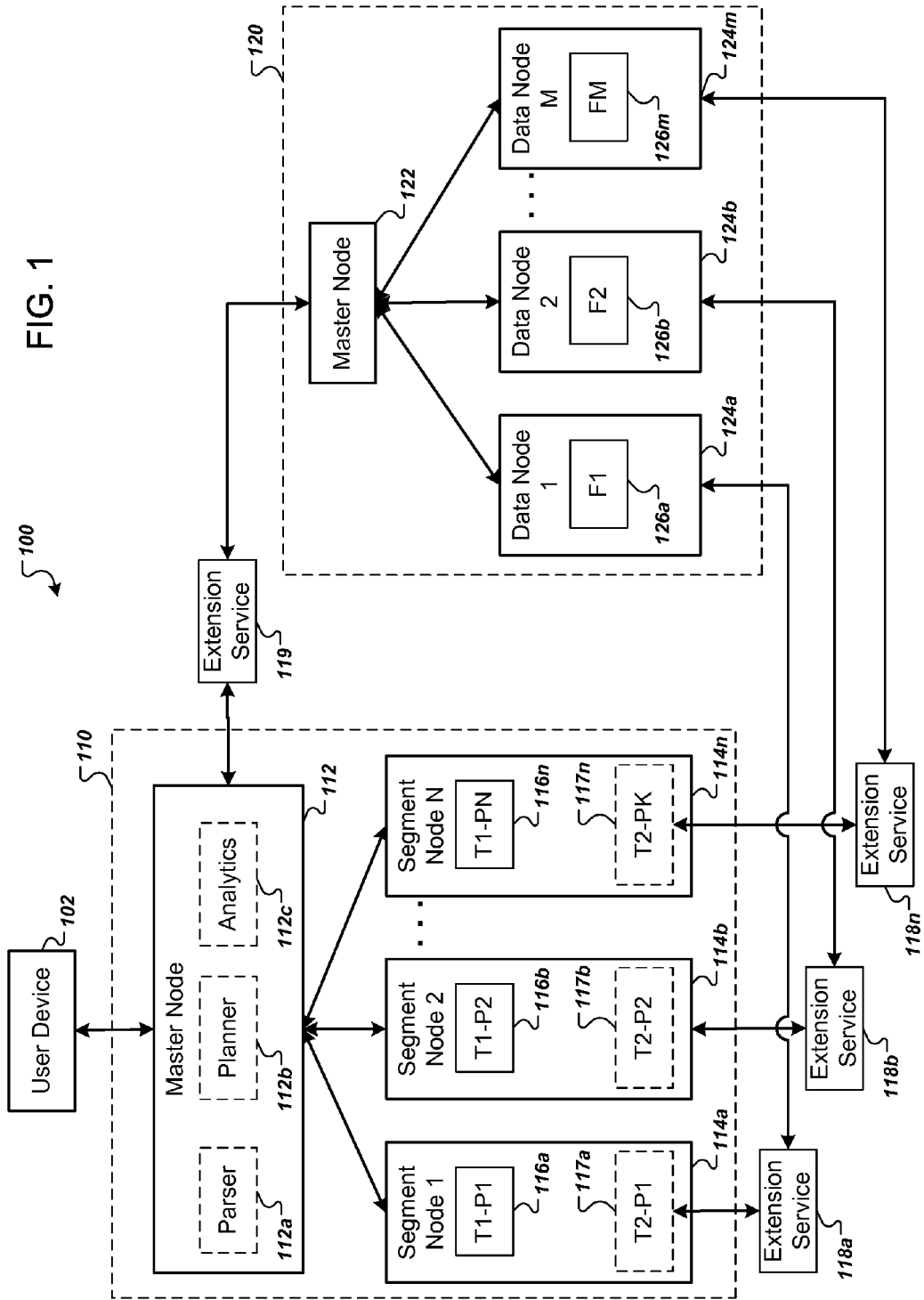
FIG. 1 is a diagram of an example system.

FIG. 1 is a diagram of an example system 100. The system 100 illustrates a first distributed system 110 that can stream and convert data in parallel from a second, external distributed system 120.

In this specification, data being "streamed" from a second distributed system to a first distributed system means that data is transferred for immediate use by the first distributed system. In other words, the first distributed system need not store the received data in nonvolatile memory. Nor does the first distributed system need to store a converted version of the data and read the converted data again in a second step. The streamed data is typically continually transferred between systems while incurring only minimal appreciable delays due to processing limitations of the systems.

In this specification, an operation occurring at "run-time" or "query-time" means that the operations on data needed to compute a result for a query occur after a query is received. In particular, a system need not have previously transferred data stored in a second distributed system, converted the data to an appropriate format, and stored the converted data. Rather, the data can be transferred, converted, and used to compute a result for a query after a query is received.

Each of the distributed systems distributes data across multiple storage devices. The data can be stored in multiple storage devices. The segment nodes can access the data by communicating with multiple data nodes in an underlying storage system, for example, the Hadoop File System (HDFS). The data can be replicated, i.e., identical copies of the data can be stored on multiple storage devices, or partitioned, i.e., different portions of the data can be stored on multiple storage devices. For example, the data portions can be table partitions of a massively parallel processing (MPP) database.

The first distributed system 110 includes a master node 112 and multiple segment nodes 114a, 114b, through 114n. The master node 112 and each segment node 114a-n is implemented as one or more physical computers or as software installed as a virtual machine on a physical computer. The master node 112 assigns each segment node to operate on a portion of data stored in the first distributed system 110.

For example, the first distributed system 110 includes a segment node 114a assigned to operate on a first partition 116a of a first database table. Similarly, segment node 114b is assigned to operate on a second partition 116b of the first database table. The distributed system 110 can include an arbitrary number N of segment nodes, up to the segment node 114n that is assigned to operate on an Nth partition of 116n of the first database table.

A user of a user device 102 can access data stored in the distributed system 110 by communicating with a master node 112. The master node 112 coordinates with the segment nodes 114a-114n to respond to requests for data from the user device 102. The user device 102 can issue a query, e.g. in structured query language (SQL) or object query language (OQL), to the master node 112. The master node 112 communicates with the segment nodes 114a-114n to obtain data that satisfies the query. The master node 112 can maintain a system catalog that provides a mapping between data portions and segment nodes that are assigned to operate on the data portions.

The first distributed system 110 can access data stored on a second distributed system 120. The second distributed system 120 includes a master node 122 that coordinates requests among M data nodes 124a, 124b, and 124m, where each of the data nodes manages a different portion of data stored on the second distributed system 120.

The second distributed system 120 may organize data in a different way and in a different format than the first distributed system 110. Thus, the individual data portions on the second distributed system will be referred to as data fragments. For example, the data node 124a manages a first fragment 126a, the data node 124b manages a second fragment 126b, and the data node 126m manages an Mth fragment 126m. For example, the second distributed system can be a Hadoop Database (HBase) that stores data by key value pairs in distinct column families or an Apache Hive system. The data itself may be stored in a particular format that the first distributed system 110 may not recognize, e.g., JavaScript Object Notation (JSON). The data fragments may also be replicated across multiple data nodes.

For the first distributed system 110 to generate a copy of and to convert all the data stored by the second distributed system 120 may be cumbersome or prohibitively expensive in terms of storage space, network bandwidth, or transfer time. In addition, the master node 112 querying the second distributed system 120 for data may also result in undesirable transfer time for very large data sets.

Instead, the system 110 can represent the data stored in the second distributed system 120 as an external table. An external table has an associated protocol that invokes an extension service when a scan of the external table is requested by a segment node. Thus, when a segment node of the first distributed system 110 receives a request to access data represented by the external table, the external table protocol causes the segment node to communicate with an extension service that provides direct streaming and conversion of data stored in the second distributed system 120. Moreover, each segment node can stream data from the second distributed system 120 in parallel by communicating with a separate extension service. In some implementations, each segment node executes its own separate extension service.

When the master node 112 receives a query, the master node 112 parses the query and generates a query plan. The query plan defines the operations that the master node 112 will distribute to the segment nodes to fulfill the query. The master node 112 may access a system catalog and perform cost estimations and optimization algorithms to determine a query plan that reduces the cost, e.g. processing time and network bandwidth required, of fulfilling the query. Functionality of the master node 112 may be implemented by multiple software modules performing different functions, for example, a query parser 112*a*, a query planner 112*b*, and an analytics module 112*c*.

The master node 112 can communicate with an extension service 119 to determine where, on the second distributed system 120, the data fragments are located. The extension service 119 can, for example, communicate with the master node 122 of the second distributed system 120 to receive a list of data fragments stored in the second distributed system 120, e.g., a list of filenames, file blocks, and data node host names. The master node 112 can also communicate with the extension service 119 to obtain statistics about the data stored by the second distributed system 120 in order to generate a more efficient query plan.

For example, the master node 112 can generate a query plan that assigns the segment node 114*a* to operate on a first partition 117*a* of an external table that is partitioned into multiple partitions 117*a-n*. The data for the external table actually resides on the second distributed system 120, stored as part of the first fragment 126*a* managed by the data node 124*a*. Thus, to access or perform operations on the external table, the segment node 114*a* will communicate with the extension service 118*a*, which accesses the data in the first fragment 126*a* directly from the data node 124*a* on the second distributed system 120. Similarly, the segment node 114*b* can communicate with an extension service 118*b* that accesses the data in a second fragment 126*b* directly from the data node 124*b*, up through the segment node 114*n* communicating with an extension service 118*n* that accesses data in an Mth fragment 126*m* directly from the data node 124*m*. Thus, the segment nodes 114*a-n* of the first distributed system 110 can stream data from the second distributed system in parallel during execution of operations to satisfy the query.

The extension services 118*a-n* and 119 are generally separate processes that communicate with the master node 122 and the data nodes 126*a-m* of the second distributed system 120. An extension service can execute on a same segment node that is requesting data from the extension service or on another computing node of the distributed system 110. In some implementations, a system has multiple extension services that each execute on a different computing node of the system.

Figure 2:
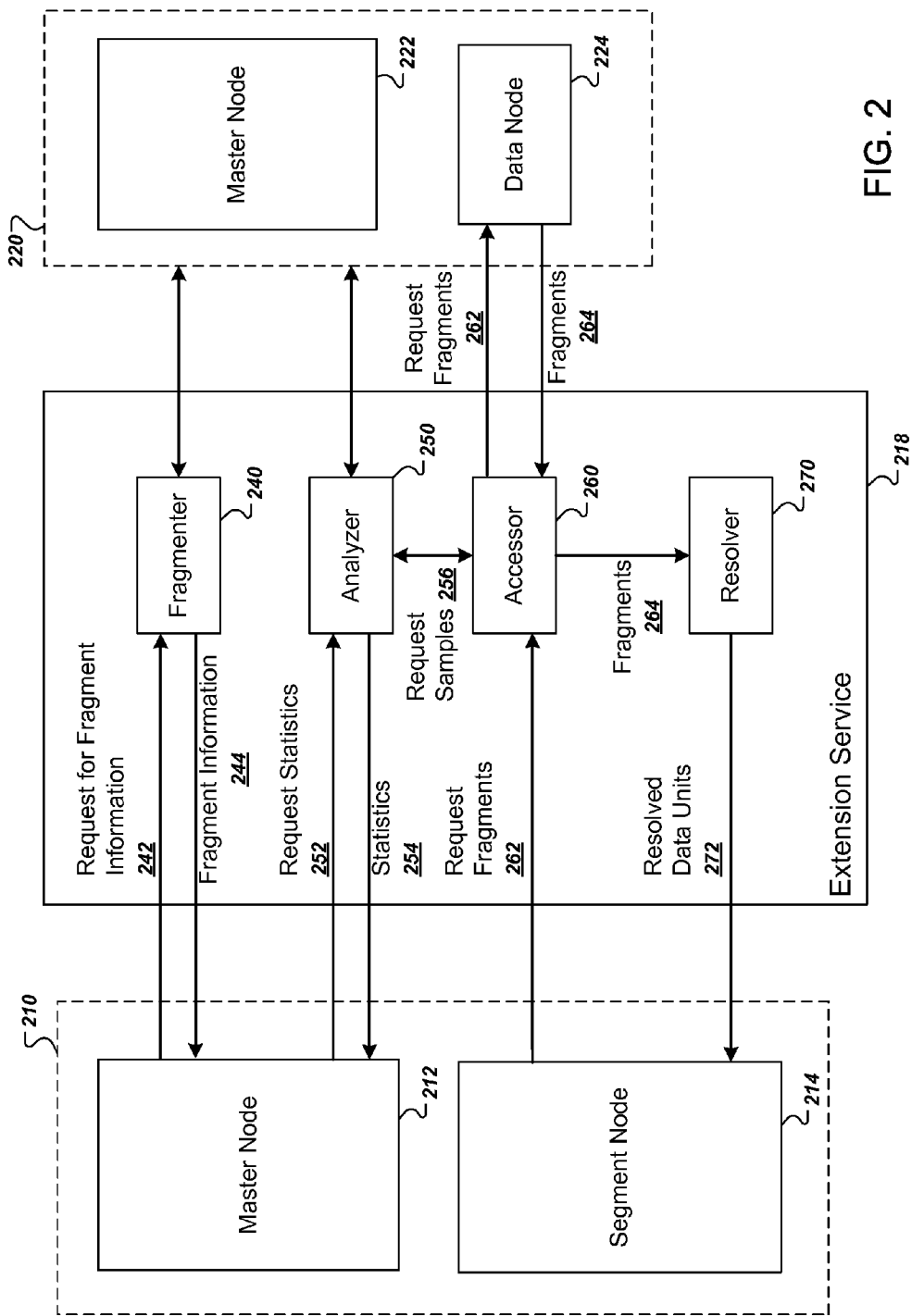
FIG. 2 is a diagram of components of an example extension service.

FIG. 2 is a diagram of components of an example extension service 218. The extension service 218 implements four software modules to support streaming of data from a second distributed system 220 to a first distributed system 210 at query time. The extension service 218 can be installed to communicate with any appropriate distributed system by development of the software modules described below: a fragmenter 240, an accessor 260, and a resolver 270. A fourth, the analyzer 250, can be implemented to improve query execution by informing the generation of query plans.

A user can define an external table on the first distributed system 210 that represents data stored by the second distributed system 220. To do so, the user specifies the fragmenter 240, the accessor 260, and the resolver 270 when creating the external table. For example, a user can issue the following command to create an external table:
CREATE EXTERNAL TABLE Customers
(
  customer_id INT,
  first_name TEXT,
  last_name TEXT)
)
LOCATION: ('pxf://<hostname>:<port>?
Fragmenter=HdfsDataFragmenter&
Accessor=TextFileAccessor&
Resolver=TextResolver')
)

The external table, "Customers," includes three fields: customer_id, first_name, and last_name. The external table definition also includes a LOCATION attribute that specifies information about the second distributed system, e.g., a directory or file of the external data. The definition also specifies a fragmenter, "HdfsDataFragmenter"; an accessor, "TextFileAccessor"; and a resolver, "TextResolver." An external table protocol will then specify that these modules should be invoked to fulfill a request for data from the external table.

A fragmenter 240 obtains information about data fragments that are located on the second distributed system 220. The master node 212 provides a request 242 for fragment information to the fragmenter 240. The master node 212 can provide the request 242 at query planning time, e.g., after receiving a query, or before receiving a query, e.g., shortly after creation of the external table. In response to the request 242, the fragmenter 240 provides fragment information 244 to the master node.

The fragment information 244 typically includes machine names or network addresses of data nodes of the second distributed system that maintain the fragments. The fragment information 244 can also include information about individual units of data on the second distributed system 220, e.g., file names of files and blocks within the files on the second distributed system 220. In general, the fragment information 244 returned by the fragmenter 240 will be in a form that can be understood by the accessor 260, which will be responsible for actually retrieving the fragments from the data nodes of the second distributed system 220 using the fragment information 244.

The fragmenter 240 typically communicates with a master node 222 of the second distributed system 220 to obtain the fragment information 244. The fragmenter 240 may also be able to communicate with individual data nodes of the second distributed system to obtain the fragment information 244. The master node 212 may request fragment information 244 for every query, although the master node 212 may alternatively add the fragment information 244 to a system catalog so that the master node 212 need not request fragment information 244 for every query.

The accessor 260 implements the functionality to access fragments of data stored by the second distributed system. For example, if the second distributed system is an HBase system, the accessor 260 can use an HBase application programming interface (API) to obtain data fragments 264 from the HBase system.

When the master node 212 generates a query plan, the master node 212 will assign one or more fragments of data to each segment node 214. To do so, the master node 212 will generally provide each segment node with fragment information 244 for fragments assigned to that node. Then, when a segment node, e.g., the segment node 214, needs to read data from tables in order to satisfy the query, known as scan time, the segment node 214 will provide, to the accessor 260, a request 262 for fragments that have been assigned by the master node 212 which will include the fragment information 244 about where the fragments are located on the second distributed system.

The accessor 260 then retrieves fragments 264 directly from a data node 224 of the second distributed system 224 using the fragment information 244 provided with the request for fragments 262. To provide for parallel streaming of data at scan time, the accessor 260 need not communicate with a master node 222 of the second distributed system 220 in order to obtain the fragments 264. Rather, the accessor 260 can obtain the fragments 264 directly from the data node 224. Similarly, other accessors of other extension services can obtain other fragments directly from other data nodes of the second distributed system 220.

A resolver 270 receives fragments 264 and converts the fragments into data units 272 that are usable by the first distributed system 110. The resolver 270 converts the fragments 264 received from the second distributed system 220 at scan time as the data is streamed from the second distributed system 120 by the accessor 260.

The resolver 270 then provides the resolved data units 272 back to the segment node 214 to be used to satisfy the query. The resolver typically receives fragments from the accessor 260. However, in some implementations, some functionality of the resolver 270 may be implemented as part of the accessor 260 and vice versa.

For example, the second distributed system 220 can store JSON records that include a person's name and address. An example JSON record can include the following information:

```
{
  "person": {
    "id": 12345,
    "name": {
      "firstName": "John",
      "lastName": "Doe"
    },
    "address": {
      "number": "123",
      "street": "Main St.",
      "city": "Anytown",
      "state": "CA",
      "zip": "53421"
    }
  }
}
```

The accessor 260 can request fragments 264 in this format from the data node 224. The resolver 270 can then convert the data fragment into a table row object that can be returned as a resolved data unit 272. Furthermore, if the query requests only certain attributes of the example JSON record, the resolver 270 can pass along only attributes requested by the query. For example, if the query requests only first names and ZIP codes, the resolver 270 can receive the example JSON record above and return, as a resolved data unit 272, only the following table row information: "id: 12345|First Name: John|ZIP: 53421."

The analyzer 250 obtains statistics on data stored by the second distributed system 220. An analytics module, e.g., analytics module 112c of FIG. 1, on the master node 212 can provide a request 252 for statistics of data stored on the second distributed system 220. For example, the analytics module can request, through the analyzer 250, a number of records, blocks, rows, or files for a particular dataset that is represented by an external table on the first distributed system 210. For example, the analyzer 250 can request that the second distributed system 220 provide a total number of customer records. In response, the second distributed system 220 can provide statistics 254. A query planner of the first distributed system 210 can use the obtained statistics 254 to make better decisions when evaluating multiple query plans.

In some cases, the second distributed system 220 may not store statistics about data stored in the second distributed system 220. The analyzer 250 may obtain statistics by dynamically collecting samples of data stored on the second distributed system 220. For example, the analyzer 250 can communicate with the accessor 260 to request samples 256 of data on the second distributed system 220. The analyzer 250 can then estimate statistics of the data on the second distributed system using samples obtained by the accessor 260.

Figure 3:
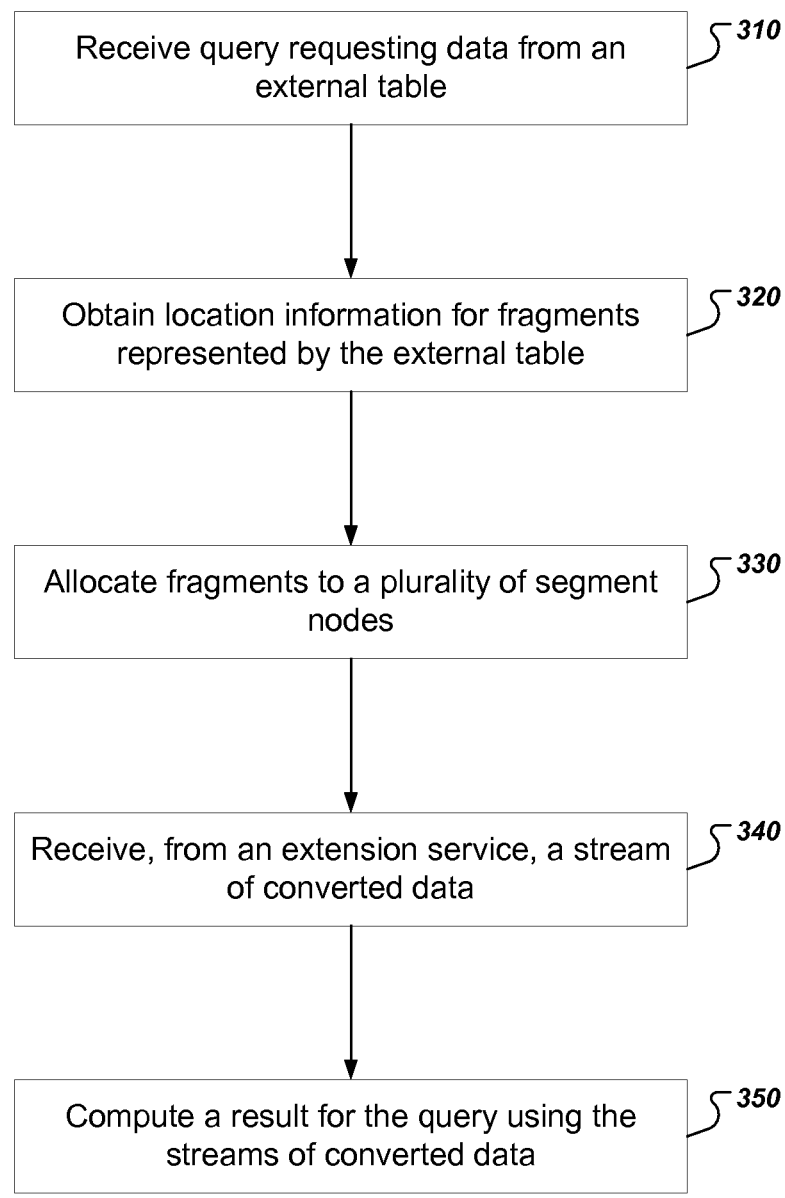
FIG. 3 is a flow chart of an example process for receiving streams of converted data from an extension service.

FIG. 3 is a flow chart of an example process for receiving streams of converted data from an extension service. In general, a system can stream and convert data in parallel from a second distributed system at scan time by using an extension service. The example process can be performed by one or more computing nodes of a distributed system, e.g., the master node 112 and segment nodes 114a-n of FIG. 1. The process will be described as being performed by an appropriately programmed system of one or more computers.

The system receives a query requesting data from an external table (310). As described above, a user of the system can define an external table that represents data stored on a second distributed system. The data in the second distributed system is often in a different format and must be converted into a first format before the system can compute a result for the query. For example, the first distributed system can be HDFS, and the second distributed system can be implemented as a NoSQL database, e.g., HBase.

When the user defines the external table, the user can specify the modules of an extension service. For example, the user can specify a fragmenter, an accessor, a resolver, and an analyzer.

The system obtains location information for a plurality of fragments represented by the external table (320). For example, a master node of the system can request location information from a fragmenter of an extension service. The request can occur at query planning time as soon as the master node determines that the query requests data from an external table. The request to the fragmenter may also occur at scanning time when the data is requested by a segment node.

In response to the request, the extension service can provide a list of fragments information that indicates where, on the second distributed system, the fragments reside.

The system allocates fragments to a plurality of segment nodes (330). In general, the system will determine a particular allocation of fragments to take advantage of parallelism. In some implementations, the system allocates a substantially equal number of fragments to each segment node. For example, if the system has 10 segment nodes and the fragmenter indicates that that there are 100 fragments, the system can allocate 10 fragments to each of the 10 segment nodes.

The system may also allocate a number of segment nodes for the query based on a number of running extension services. For example, if there are only 5 running extension services, the system may allocate 20 segment nodes so that each extension service is assigned to service 4 segment nodes. The system can then allocate the fragments proportionally among each of the 20 segment nodes.

The system can also allocate fragments according to locality. For example, an extension service may be executing on a machine that stores data fragments. Thus, the system can allocate that extension service to read the data fragments that are stored on the same machine to take advantage of locality.

The system receives a stream of converted data (340). After allocating fragments to the segment nodes, each segment node will communicate with an extension service by providing the list of fragments to be obtained. Each extension service will then obtain the fragments from the second distributed system and convert the fragments into converted data in a first format.

The extension service can, for example, convert data from a column-oriented format to a row-oriented format. For an example data set that includes two customers, Bob Jones and Jim Jones, a column-oriented format may store the records on a particular data node of the second distributed system in a file as:

first_name: Bob: 001, Jim: 002; last_name: Jones: 001, 002, wherein 001 and 002 represent customer identifiers. In this column-oriented format, the last name "Jones" occurs only once, along with a list of customer identifiers having a last name "Jones."

The fragmenter of an extension service can identify this file as including two fragments, one for Bob Jones, and one for Jim Jones. The master node can then assign these two fragments to a particular segment node of the first distributed system.

The segment node can then request the fragments by providing a request to an accessor of the extension service. The request can include the fragment information that identifies where on the second distributed system the fragments are located.

The accessor can then communicate directly with the data node of the second distributed system to obtain the file storing the records for Bob Jones and Jim Jones. Typically, the accessors of multiple executing extension services will be communicating directly with data nodes of the second distributed system in parallel.

The accessor can then pass the file received from the second distributed system to a resolver of the extension service, which can convert the fragments into a row-oriented format. For example, the resolver can convert the data into the following row-oriented format:

001, Bob, Jones; 002, Jim, Jones.

The resolver can then pass the resolved data back to the segment node for further processing.

The system computes a result for the query using the streams of converted data (350). The system will generally receive streams of converted data in parallel from multiple extension services. Each segment node can, for example, extract data from the fragments matching a particular attribute specified by the query, e.g., customers having a last name "Smith."

Because the extension services can read data in parallel from the second distributed system, the join can be computed in parallel by the segment nodes of the first distributed system. In other words, the segment nodes of the first distributed system need not store data received from second distributed system in nonvolatile memory before computing a result of the join, nor do the segment nodes of the first distributed system need to store the converted data in a database of the first distributed system before computing a result of the join.

Figure 4:
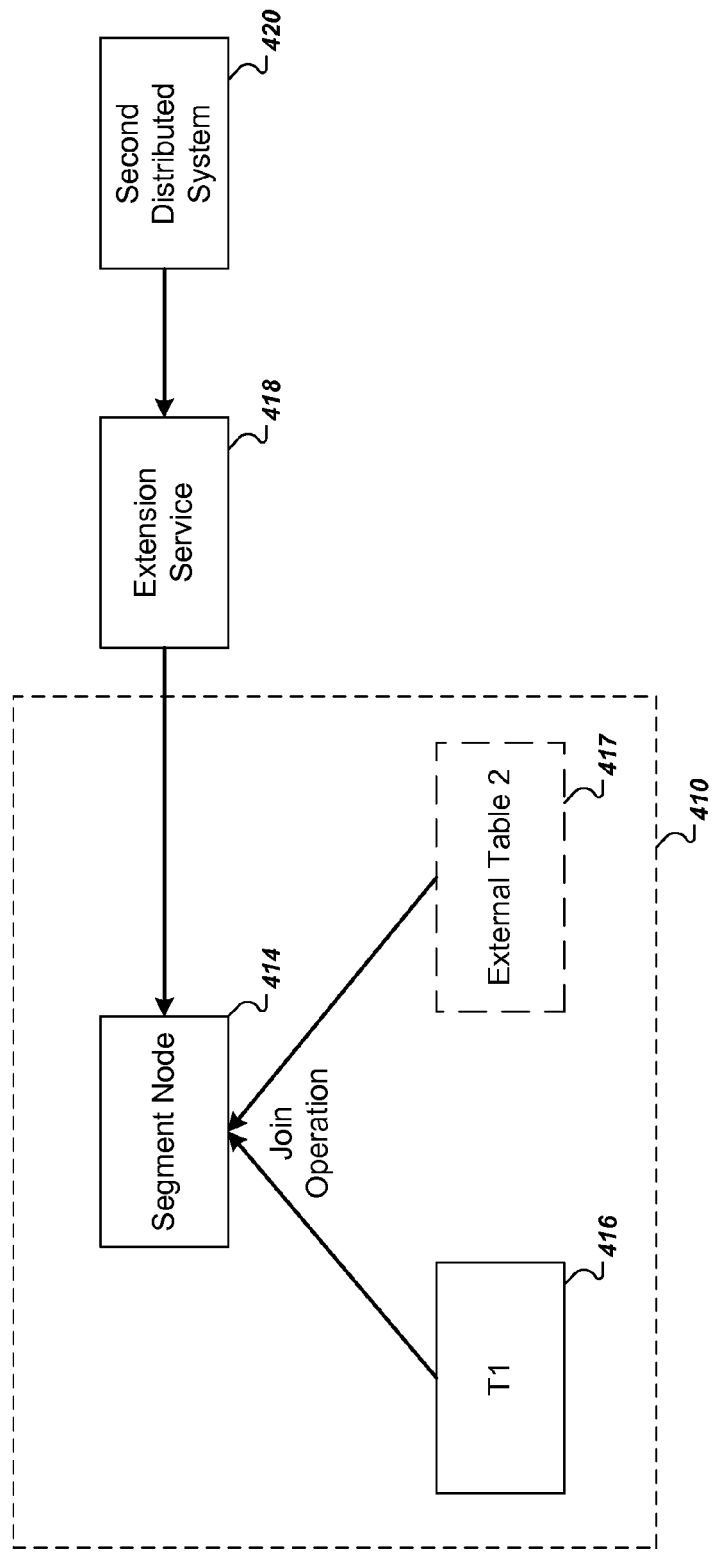
FIG. 4 is a diagram of using an extension service to perform a join on data stored in a second distributed system.

FIG. 4 is a diagram of using an extension service to perform a join on data stored in a second distributed system. A segment node 414 of a first distributed system 410 can perform a join of data in a first table 416 with an external table 417 that represents data stored on a distributed system 420.

In general, a join operation between two tables identifies rows in the tables that have a common attribute. For example, TABLE 1 is an example customer table with two attributes, customer ID and customer name. The data in TABLE 1 may be stored in the first table 416 in the first distributed system 410.

TABLE 1

| CUSTOMER ID | CUSTOMER NAME |
|---|---|
| 123 | John Smith |
| 546 | Sheila Jones |
| 951 | Tom Sanders |

TABLE 2 is an example orders table with two attributes, order ID and customer ID. The data in TABLE 2 may be represented by the external table 417 and actually stored in the second distributed system 420.

TABLE 2

| ORDER ID | CUSTOMER ID |
|---|---|
| 18233 | 123 |
| 14576 | 546 |
| 11991 | 546 |

To perform a join between TABLE 1 and TABLE 2, a system can identify rows that have a common attribute. In this example, the system can identify rows in which the customer IDs match, e.g., the first customer row and the first orders row, as well as the second customer row with the second and third orders row. The output of a join operation can be one or more attributes from rows that have the common attribute, e.g., as shown in TABLE 3.

TABLE 3

| ORDER ID | CUSTOMER ID | CUSTOMER NAME |
|---|---|---|
| 18233 | 123 | John Smith |
| 14576 | 546 | Sheila Jones |
| 11991 | 546 | Sheila Jones |

To compute the result in TABLE 3, the segment node 414 can request, from the extension service 418, a number of fragments of data stored on the second distributed system 420. The extension service 418 then obtains the fragments directly from data nodes of the second distributed system, converts the fragments as appropriate, and returns the fragments to the segment node 414.

The segment node 414 can compute any appropriate join operation using the extension service 418, e.g., an inner join that returns matching attributes that occur in both tables, a left join that returns all rows from the left table and matched rows from the right table, a right join that returns all rows from the right table and matched rows from the left table, and a full join that returns all rows when there is at least one matched attribute between the tables.

Figure 5:
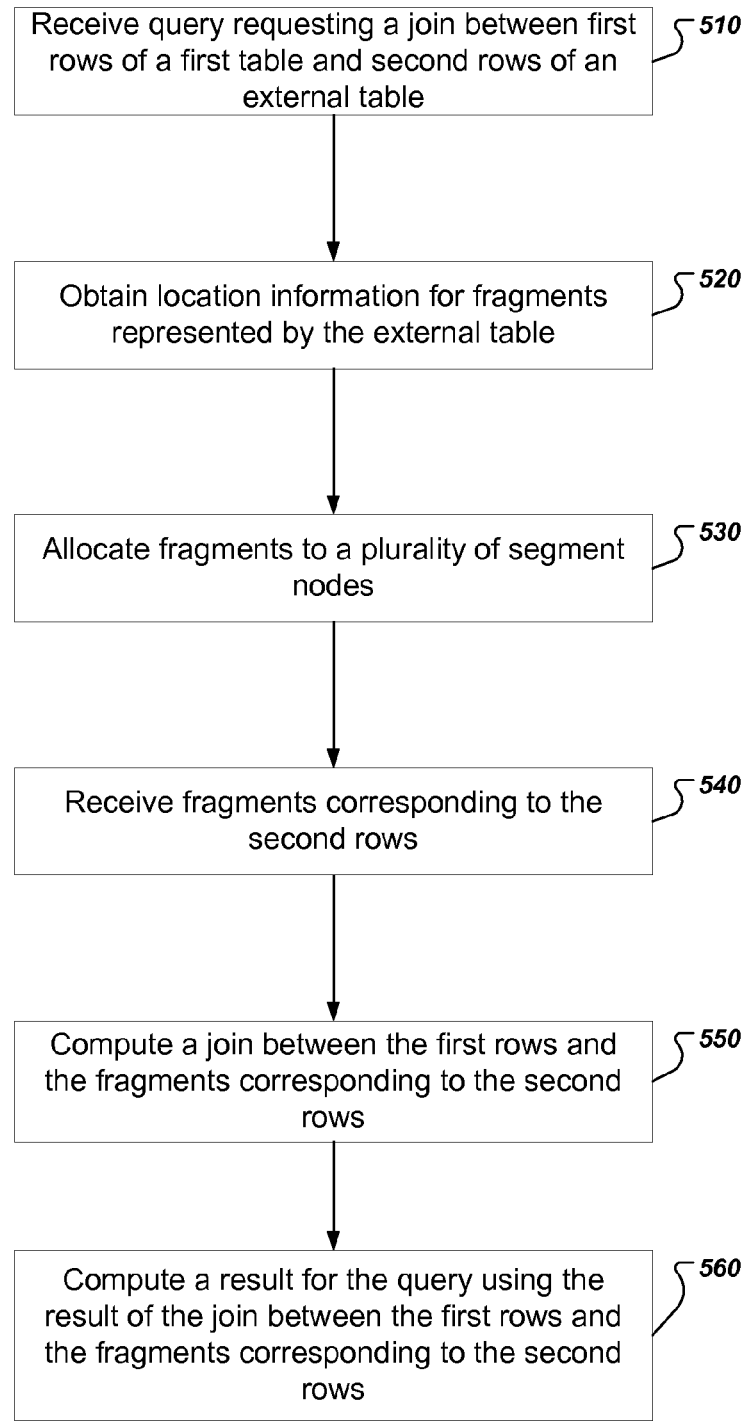
FIG. 5 is a flow chart of an example process for computing a run-time join of data in a first distributed system and data in a second distributed system.

FIG. 5 is a flow chart of an example process for computing a run-time join of data in a first distributed system and data in a second distributed system. In general, a system can perform a run-time join between the two systems. The example process can be performed by one or more computing nodes of a distributed system, e.g., the master node 112 and segment nodes 114a-n of FIG. 1. The process will be described as being performed by an appropriately programmed system of one or more computers.

The system receives a query requesting a join between first rows of a first table and second rows of an external table (510). As described above, an external table represents data stored on a second distributed system that is distinct from a first distributed system. In addition, the data in the second distributed system may be in a different format than the first table of the first distributed system.

The system obtains location information for fragments represented by the external table (520). The fragmenter of an extension service communicates with the second distributed system to determine where the data represented by the external table resides.

The system allocates fragments to a plurality of segment nodes (530). The query planner of the first distributed system will determine how best to handle the join operation. When multiple segments nodes are performing a join operation on two tables, the data can be handled in a variety of ways.

For example, the query planner can determine that the first table of the first distributed system should be read in its entirety by each of the segment nodes. In this case, each segment node needs to read only a particular portion of fragments allocated by the query planner. Each segment node will then compute a join between the entire first table and the particular allocated portion of fragments from the second distributed system. This situation can occur, e.g., if the first table is small relative to the data represented by the external table.

The query planner may also determine that all the fragments of the second distributed system should be read by all segment nodes. Each segment node can then perform a join using all the fragments of the second distributed system and only a particular partition of the first table. This situation can occur, e.g., if the first table is large relative to the data represented by the external table.

The query planner may also determine that keys of the external table should be redistributed by attribute values. This situation can occur, e.g., if both tables are relatively large. For example, the query planner can determine that rows of an orders table should be redistributed by customer ID. In this case, each segment node can read fragments from the second distributed system and map the rows by attribute value to a particular other segment node in order to compute the result of the join operation.

The system receives fragments corresponding to the second rows (540). Each segment node will provide the location information for the fragments to the extension service to obtain fragments from the second distributed system. In some cases, the segment nodes may also convert the fragments into a different format, e.g., as described above with reference to FIG. 3.

The system computes a join between the first rows and the fragments corresponding to the second rows (550). The system can compute the join as the segment nodes read the fragments in parallel from the second distributed system. In other words, the system can compute the join using data stored in the second distributed system without reading and storing the data on the first distributed system.

Furthermore, the system can compute run-time joins with systems that store data in a different, second format. For example, the system can compute a join between data stored in an HDFS format and data stored on an HBase or Hive system.

The system computes a result for the query using the result of the join operation between the first rows and the fragments corresponding to the second rows (560). For example, a node of the system can collect joined rows from each of the segment nodes and return the result or perform further operations on the result of the join.

Figure 6A:
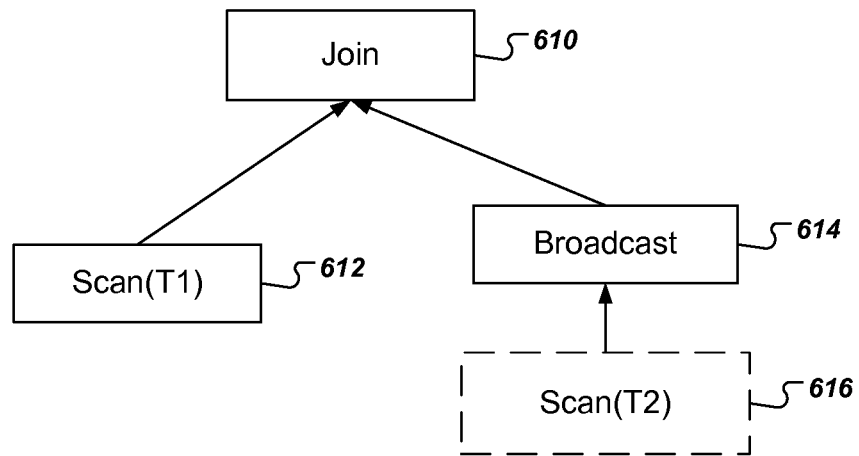
FIGS. 6A and 6B are diagrams of two candidate query plans.
Figure 6B:
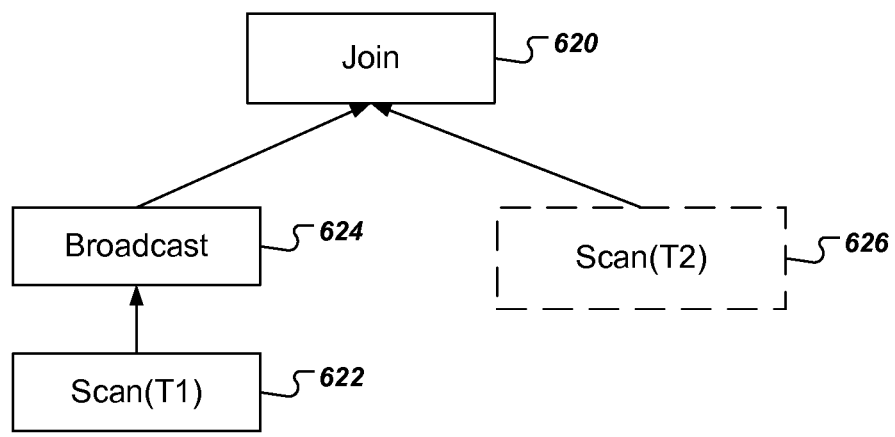

FIGS. 6A and 6B are diagrams of two candidate query plans. A query plan is a set of steps that a system will take to compute a result for a query. A query can typically be computed according to any of multiple functionally equivalent query plans. A query planner, e.g., query planner 112*b*, can evaluate multiple query plans and select a query plan that is the most efficient in terms of scanning time, intermediate storage required, or overall computation time, for example.

Both FIGS. 6A and 6B represent functionally equivalent query plans for a join operation between a first table stored in a first distributed system and an external table that represents data stored in a second distributed system. The join operation requires determining rows of a table T1 and an external table T2 that have a particular attribute in common. As described above with reference to FIG. 5, to compute a join operation on distributed tables, one option is for the system to broadcast the data of either table in its entirety to each of the segment nodes.

In FIG. 6A, the query plan specifies by the scan operation 616 that the rows of table T2 should be read. The query plan also specifies by the broadcast operation 614 that the rows read from table T2 should be broadcast to each of the segment nodes of the system.

Each segment node will then read only a portion of the table T1 according to the scan operation 612, e.g., a portion as assigned by a master node of the system. Each segment node will then compute a join according to the join operation 610 using the assigned portion of the table T1 and the entirety of the broadcast table T2.

However, if table T2 is very large, the query plan in FIG. 6A may not be the most efficient query plan for computing a join between the tables. Replicating the entire contents of table T2 to every segment node may be expensive in terms of data transfer cost, intermediate storage, and total computation time.

In contrast, the query plan in FIG. 6B specifies that the table T1 is broadcast to the segment nodes instead of the table T2. The query plan specifies by the scan operation 622 and the broadcast operation 624 that the rows of the table T1 should be read and broadcast in their entirety to all of the other segment nodes. Each of the segment nodes can then perform the join operation 620 using the broadcast contents of the table T1 and only portions of the table T2 according to the scan operation 626, e.g., a portion as assigned by the master node of the system.

Because the table T2 is an external table that represents data on a second distributed system, the data represented by the table T2 can be streamed in parallel to multiple segment nodes by multiple extension services. Thus, the query plan in FIG. 6B may be a more efficient query plan.

Figure 7:
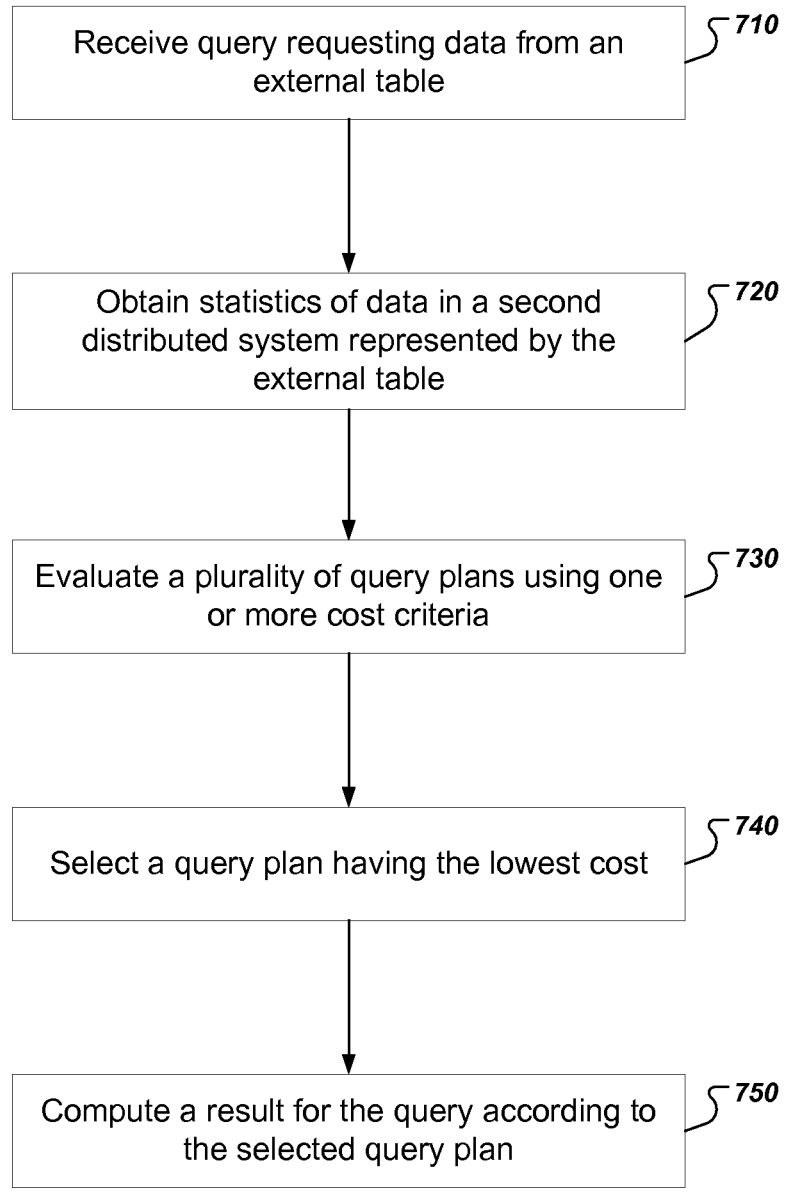
FIG. 7 is a flow chart of an example process for obtaining external data statistics for query planning.

FIG. 7 is a flow chart of an example process for obtaining external data statistics for query planning A first distributed system can obtain the external data statistics for data fragments stored in a second distributed system. The first distributed system can then use the external data statistics to in order select an efficient query plan for accessing the data on the second distributed system by an extension service. The process will be described as being performed by an appropriately programmed system of one or more computers.

The system receives a query requesting data from an external table (710). As described above, the external table is a table defined on a first distributed system that represents data stored on a second distributed system.

The system obtains statistics of data in a second distributed system represented by the external table (720). The statistics can include how many fragments, blocks, rows, or any other appropriate data unit, are represented by the external table. The statistics can also include statistics about the size of the data content or the type of file in which the data is stored.

The system typically calls an analyzer of an extension service before a query is received in order to obtain the external data statistics. Once obtained, the external data statistics can be added to a system catalog of the system. The query planner can then obtain the external data statistics from the system catalog for determining a query plan after the query is received.

The system can also compute an estimate for statistics of the data stored on the second distributed system by sampling the data on the second distributed system. For example, the system can communicate with an accessor module to obtain a random or pseudorandom selection of rows for a particular attribute of an external table. The system can then compute an estimate for a number of rows having the attribute or a number of unique values for the attribute, to name just a few examples. The sampling can be performed by an analyzer module of an extension service or by a master node of the first distributed system.

The system evaluates a plurality of query plans using one or more cost criteria (730). A query planner can enumerate multiple query plans that can compute a result for the query. In doing so, the query planner can compute a cost estimate associated with each of the operations in the query plan.

For example, the cost criteria can include a cost of scanning the data from the second distributed system. The query planner can take a number of factors into consideration when computing the cost of scanning the external table. In general, the query planner will use different cost estimates for scanning internal tables stored on the first distributed system than cost estimates for scanning external tables.

The query planner typically considers cost criteria that include a number of blocks, rows, or other data units that must be read from the second distributed system. The query planner can also consider the size of the data units to be streamed to the first distributed system. Because the data will be streamed by multiple extension services, the query planner can also consider a number of extension services that will be used to stream the data from the second distributed system. The query planner can also consider measures of network bandwidth between the first distributed system and the second distributed system, disk space required to materialize the data from the second distributed system on the first distributed system, a cost of replicating the entirety of a single table to each of the segment nodes. The external data statistics thus allow the query planner to make more informed decisions about which query plan is likely to be most efficient.

The system selects a query plan having the lowest cost (740). For example, if the external data statistics indicates that the size of the data in the second distributed system is relatively small, the query planner may select a query plan that broadcasts the data from the second distributed system to each of the segment nodes. In contrast, if the external data statistics indicates that the size of the data in the second distributed system is relatively large, the query planner can choose a different query plan The system computes a result for the query according to the selected query plan (750). After selecting a query plan, the system can execute the query plan. Scan operations on the external table in the query plan can cause the system to invoke multiple extension services that will stream the data in parallel to the segment nodes of the first distributed system.

The allocation of segment nodes to extension services can be determined by a master node after obtaining fragment information from a fragmenter of an extension service, as described above with reference to FIG. 2.

Figure 8:
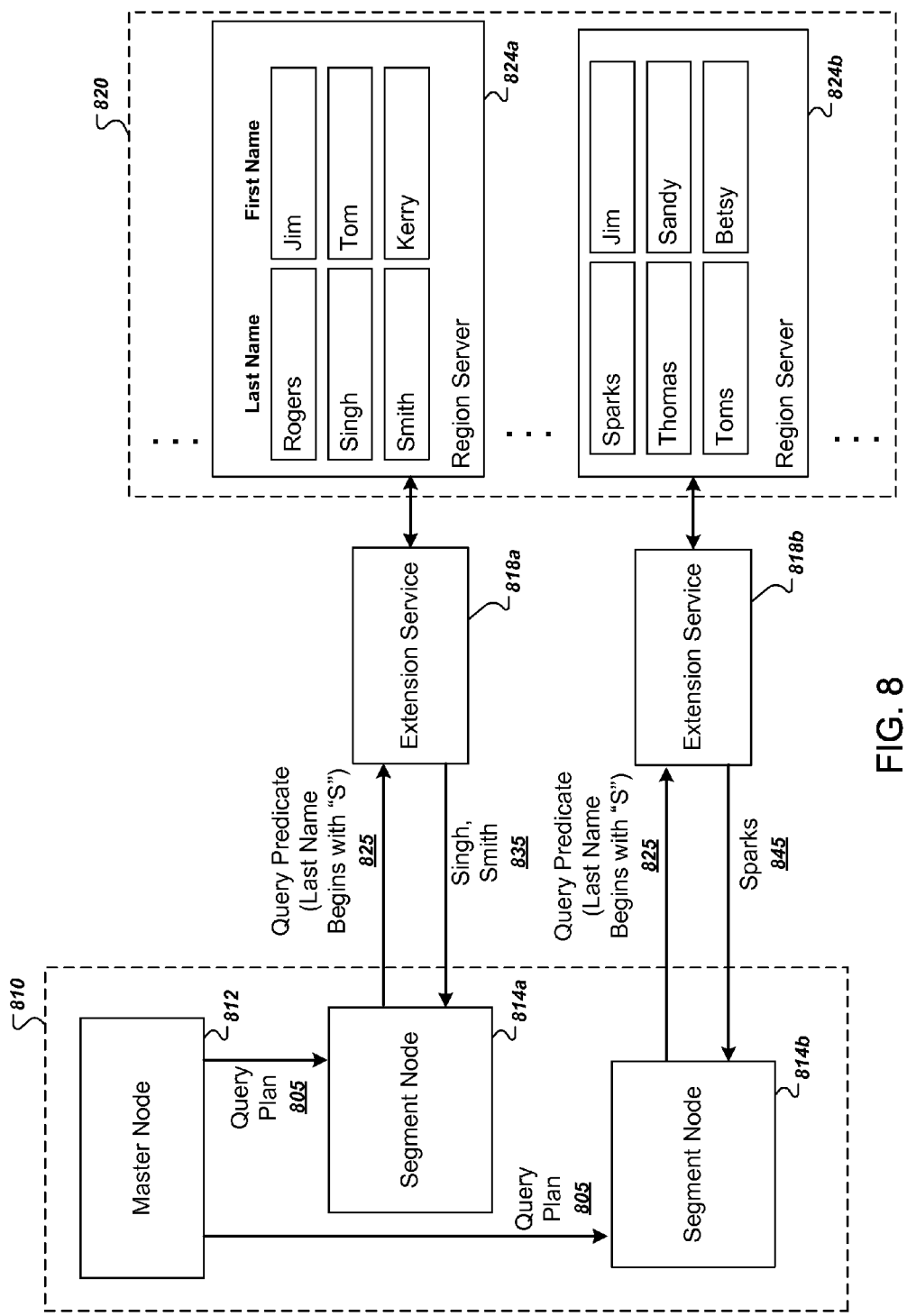
FIG. 8 is a diagram of pushing query predicates to an extension service.

FIG. 8 is a diagram of pushing query predicates to an extension service. In general, a first distributed system 810 can push a query predicate to an extension service so that the extension service only returns fragments from a second distributed system 820 that satisfy the query predicate.

A query predicate is a condition specified in the query on a particular attribute of a requested table. Thus, a system computes a result for the query using only rows from the requested table having attributes that satisfy the condition specified by the predicate. For example, the following example query specifies a predicate using a WHERE clause.

SELECT *
FROM Orders
WHERE Orders.price>300.00;

The predicate "WHERE Orders.price>300.00" specifies a condition on rows of the table "Orders" that will be used to compute a result for the query. In this example, the system will use only rows from the "Orders" table having a value of the price attribute that is greater than 300.00 to compute a result for the query.

A query may specify a predicate on attributes of an external table that represents data in a second distributed system 820. In this case, the first distributed system 810 can push the predicate 825 to an extension service, e.g., the extension service 818a, so that the extension service returns only fragments from the second distributed system 820 having attributes that satisfy the query predicate. In other words, to push a predicate to an extension service means that the extension service will determine whether fragments on the second distributed system have attributes that satisfy the condition specified by the predicate, rather than the extension service returning all fragments and having the segment nodes determine if the condition is satisfied.

The determination by the extension service as to whether the attribute satisfies the predicate may be referred to as filtering the fragments from the second distributed system. Thus, when a predicate is pushed to the extension service, the extension service can return a stream of filtered data in which each fragment of the stream has attributes that satisfy the predicate condition. Pushing predicates to the extension service can result in large performance gains and can conserve valuable resources, e.g., in terms of network bandwidth and disk reads and writes required.

Filtering fragments by an extension service can more efficient in many situations. In particular, the data stored on the second distributed system may be stored in a way that makes filtering by the extension services more efficient. For example, the data in the second distributed system 820 may be a column-oriented system, e.g., HBase, that stores ordered data that is partitioned onto multiple region servers that act as data nodes for the system 820. The data is ordered by a last name attribute. Thus, a first region server 824a stores only last names that begin with "R" or "S," and a second region server 824b stores only last names that begin with "S" or "T." Thus, if the query requests only last names that begin with "S," the predicate can be pushed to the extension services, which will in turn obtain only fragments having a last name attribute that begins with "S." In this example, the extension services need not obtain any fragments from a majority region servers of the second distributed system 820, e.g., region servers that might store last names that begin with "A." Rather, the extension services 818a-b can communicate only with the region servers 824a-b to obtain fragments having last names that begin with "S."

To push a predicate to an extension service, the master node 812 of the first distributed system can generate a query plan that pushes a query predicate to a scan operation of the query plan. If the scan operation is a scan operation on an external table, each segment node can push the predicate to a respective extension service when performing a corresponding scan operation.

For example, the master node 812 may receive the following query that requests rows of data from an external table "Customers":

SELECT *
FROM Customers
WHERE LEFT(last_name, 1)="S";

The WHERE clause has a predicate that specifies a condition on the rows to be returned from the "Customers" table. In this example, the WHERE clause specifies that the attribute "last_name" must begin with "S," where the LEFT operator returns the left-most n characters of a character string attribute.

The master node 812 generates a query plan 805 and provides the query plan 805 to the segment nodes 814a-b. The query plan can include a scan operation on the "Customers" table, which is an external table that represents data stored on the second distributed system 820. Thus, the segment nodes 814a-b can provide the query predicate 825 to the extension services 818a-b when performing the scan operation on the external table as specified by the query plan 805. The extension services 818a-b can then obtain the data directly from respective region servers 824a-b of the second distributed system 820.

An extension service can apply the query predicate at scan time as functionality of an accessor module of the extension service. In other words, the accessor module can read the data fragments from the second distributed system but return only those fragments having an attribute that satisfies the query predicate. An extension service may also apply the query predicate as functionality of a resolver module that converts the fragments to another format. Thus, the resolver module can receive fragments from an accessor module, convert the fragments to another format, but return only data having an attribute that satisfies the query predicate.

For example, the accessor module of the extension service 818a can communicate with the region server 824a to obtain fragments for the external table. The accessor module of the extension service 818a can then directly determine which fragments have a last name attribute that satisfies the query predicate, e.g., last name attributes that begin with "S."

Thus, the extension service 818a provides to the segment node 814a only a subset of the fragments on the region server 824a, e.g., only fragments 835 for the customers Tom Singh and Kerry Smith. Similarly, the extension service 818b returns to the segment node 814b only fragments 845 from the region server 824b that have a last name attribute that satisfies the query predicate 825, e.g., only the fragment 845 for the customer Jim Sparks.

Figure 9:
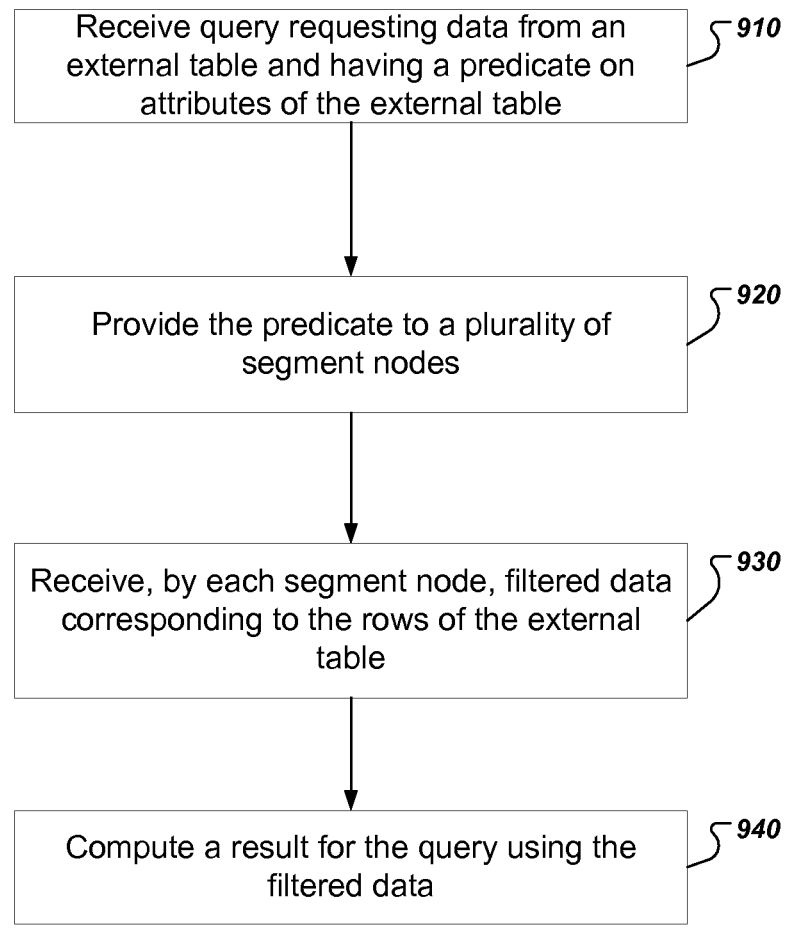
FIG. 9 is a flow chart of an example process for computing a result for a query by pushing a query predicate to an extension service.

FIG. 9 is a flow chart of an example process for computing a result for a query by pushing a query predicate to an extension service. In general, a first distributed system will generate a query plan that causes a predicate in the query to be pushed to multiple extension services at scan time. The extension services will then return filtered data from a second distributed system that have attributes that satisfy the query predicate. The process will be described as being performed by an appropriately programmed system of one or more computers.

The system receives a query requesting data from an external table and having a predicate on attributes of the external table (910). A master node of the system may invoke a fragmenter of an extension service to determine where the fragments corresponding to the external table are located on the second distributed system. The master node can allocate a portion of fragments to each of a plurality of segment nodes.

The system provides the predicate to a plurality of segment nodes (920). The master node can generate a query plan that causes the predicate to be pushed to the extension services upon the segment nodes performing a scan operation on the external table and can provide the query plan to each of the plurality of segment nodes.

When the segment nodes perform a scan operation on the external table, the segment nodes will invoke respective extensions services to obtain the data in parallel from a second distributed system. The segment nodes will also provide the predicate to the extension services so that the extension services can determine which fragments have attributes that satisfy the query predicate.

In general, the segment nodes can provide any appropriate predicate specified by a query, e.g., as specified by a WHERE or HAVING clause of a query. In some implementations, the system provides predicates to an extension service that have an attribute, an operator, and a constant. The attribute of the predicate is the attribute that must have a value satisfied by the operator and the constant. The operator can be any appropriate operator, e.g., a less-than operator "<", a greater-than operator ">", a less-than-or-equal-to operator "<=", a greater-than-or-equal-to operator ">=", an equal-to operator "=", and a not-equal-to operator "!=", to name just a few examples. The constant of the predicate specifies the attribute value to be tested. In some implementations, the system only pushing predicates to the extension services when satisfaction of the predicate does not depend upon other operations or intermediate results computed for the query, e.g., results from a join operation.

The system receives, by each segment node, filtered data corresponding to the rows of the external table (930). Each segment node can receive a stream of filtered data from a respective extension service. Because the extension service returns only filtered data having attributes that satisfy the query predicate, some segment nodes may receive no data from the extension services. This may be true even when a master node of the system assigned fragments of the second distributed system to be retrieved by a particular segment node, e.g., fragments of last names that, when read by an accessor module of the extension service, turned out not to satisfy a predicate on a last name attribute.

The system computes a result for the query using the filtered data (940). The segment nodes receive a stream of filtered data from the respective extension services and compute a result for the query using the stream of filtered data. The segment nodes need not store the filtered data in a database of the first distributed system or in nonvolatile memory of the first distributed system.

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification can be implemented as one or more computer programs, i.e., one or more modules of computer program instructions encoded on a tangible non-transitory program carrier for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. The computer storage medium can be a machine-readable storage device, a machine-readable storage substrate, a random or serial access memory device, or a combination of one or more of them. The computer storage medium is not, however, a propagated signal.

The term "data processing apparatus" encompasses all kinds of apparatus, devices, and machines for processing data, including by way of example a programmable processor, a computer, or multiple processors or computers. The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, or a combination of one or more of them.

A computer program (which may also be referred to or described as a program, software, a software application, a module, a software module, a script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, e.g., one or more scripts stored in a markup language document, in a single file dedicated to the program in question, or in multiple coordinated files, e.g., files that store one or more modules, sub-programs, or portions of code. A computer program can be deployed to be executed on one computer or on multiple computers that are located at one site or distributed across multiple sites and interconnected by a communication network.

As used in this specification, an "engine," "software engine," or "software module" refers to a software implemented input/output system that provides an output that is different from the input. An engine or module can be an encoded block of functionality, such as a library, a platform, a software development kit ("SDK"), or an object. Each engine or module can be implemented on any appropriate type of computing device, e.g., servers, mobile phones, tablet computers, notebook computers, music players, e-book readers, laptop or desktop computers, PDAs, smart phones, or other stationary or portable devices, that includes one or more processors and computer readable media. Additionally, two or more of the engines or modules may be implemented on the same computing device, or on different computing devices.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application-specific integrated circuit).

Computers suitable for the execution of a computer program include, by way of example, can be based on general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device, e.g., a universal serial bus (USB) flash drive, to name just a few.

Computer-readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) monitor, an LCD (liquid crystal display) monitor, or an OLED display, for displaying information to the user, as well as input devices for providing input to the computer, e.g., a keyboard, a mouse, or a presence sensitive display or other surface. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending resources to and receiving resources from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system modules and components in the embodiments described above should not be understood as requiring such separation in all embodiments, and it should be understood that the described program components and systems can generally be integrated together in a single software product or packaged into multiple software products.

Particular embodiments of the subject matter have been described. Other embodiments are within the scope of the following claims. For example, the actions recited in the claims can be performed in a different order and still achieve desirable results. As one example, the processes depicted in the accompanying figures do not necessarily require the particular order shown, or sequential order, to achieve desirable results. In certain implementations, multitasking and parallel processing may be advantageous.

What is claimed is:

1. A computer-implemented method comprising:
representing, by a first distributed system, as an external table, data stored in a second distributed system;
receiving, by a first master node of a first distributed system, a query that requests rows of data of the external table representing data stored in the second distributed system,
wherein the first distributed system comprises the first master node and multiple segment nodes,
wherein the first master node assigns each segment node to operate on a respective portion of data stored in the first distributed system,
wherein the external table has an associated protocol that (i) is invoked when a segment node of the first distributed system receives a request from the first master node to access data represented by the external table and that (ii) causes the segment node to communicate with a segment extension service that provides direct streaming and conversion of data stored in the second distributed system,
wherein the second distributed system is distinct from the first distributed system and comprises a second master node that coordinates requests among data nodes that each manage a different data fragment of data stored on the second distributed system, and
wherein the segments nodes of the first distributed system are each operable to stream data in parallel from the second distributed system;
obtaining, by the first master node, statistics of the data stored in the second distributed system represented by the external table;
evaluating, by the first master node, a plurality of query plans using one or more cost criteria, including computing a cost associated with each of the query plans, wherein the cost criteria includes (i) a scanning cost of reading all the data stored in the second distributed system based on the statistics for broadcast to the segment nodes of the first distributed system, and (ii) a scanning cost of reading, from data nodes of the second distributed system in parallel, portions of the external table requested by segment nodes of the first distributed system;
selecting, by the first master node, a query plan from the plurality of query plans based at least in part on the cost associated with each of the query plans; and
computing, by the first master node, a result for the received query according to the selected query plan.

2. The method of claim 1, wherein obtaining, by the first master node, statistics of the data stored in the second distributed system represented by the external table comprises obtaining a number of fragments, rows, or blocks of data stored on the external system.

3. The method of claim 1, wherein computing a cost associated with each of the query plans comprises using different cost criteria for scanning internal tables of data stored on the first distributed system than scanning external tables representing data stored on the second distributed system.

4. The method of claim 1, wherein the one or more cost criteria include a measure of network bandwidth between the first distributed system and the second distributed system.

5. The method of claim 1, wherein the second distributed system stores fragments of data in a second format that is different from a first format of a first table in the first distributed system.

6. The method of claim 5, wherein the second distributed system is a NoSQL database.

7. The method of claim 1, further comprising:
receiving the statistics from an analyzer of an extension service; and
storing the statistics in a system catalog for use by a query planner.

8. A system comprising:
one or more computers and one or more storage devices storing instructions that are operable, when executed by the one or more computers, to cause the one or more computers to perform operations comprising:
representing, by a first distributed system, as an external table, data stored in a second distributed system;
receiving, by a first master node of a first distributed system, a query that requests rows of data of the external table representing data stored in the second distributed system,
wherein the first distributed system comprises the first master node and multiple segment nodes,
wherein the first master node assigns each segment node to operate on a respective portion of data stored in the first distributed system, wherein the external table has an associated protocol that (i) is invoked when a segment node of the first distributed system receives a request from the first master node to access data represented by the external table and that (ii) causes the segment node to communicate with a segment extension service that provides direct streaming and conversion of data stored in the second distributed system, wherein the second distributed system is distinct from the first distributed system and comprises a second master node that coordinates requests among data nodes that each manage a different data fragment of data stored on the second distributed system, and wherein the segments nodes of the first distributed system are each operable to stream data in parallel from the second distributed system;

obtaining, by the first master node, statistics of the data stored in the second distributed system represented by the external table;

evaluating, by the first master node, a plurality of query plans using one or more cost criteria, including computing a cost associated with each of the query plans, wherein the cost criteria includes (i) a scanning cost of reading all the data stored in the second distributed system based on the statistics for broadcast to the segment nodes of the first distributed system, and (ii) a scanning cost of reading, from data nodes of the second distributed system in parallel, portions of the external table requested by segment nodes of the first distributed system;

selecting, by the first master node, a query plan from the plurality of query plans based at least in part on the cost associated with each of the query plans; and computing, by the first master node, a result for the received query according to the selected query plan.

9. The system of claim 8, wherein obtaining, by the first master node,
statistics of the data stored in the second distributed system represented by the external table comprises obtaining a number of fragments, rows, or blocks of data stored on the external system.

10. The system of claim 8, wherein computing a cost associated with each of the query plans comprises using different cost criteria for scanning internal tables of data stored on the first distributed system than scanning external tables representing data stored on the second distributed system.

11. The system of claim 8, wherein the one or more cost criteria include a measure of network bandwidth between the first distributed system and the second distributed system.

12. The system of claim 8, wherein the second distributed system stores fragments of data in a second format that is different from a first format of a first table in the first distributed system.

13. The system of claim 12, wherein the second distributed system is a NoSQL database.

14. The system of claim 8, wherein the operations further comprise:
receiving the statistics from an analyzer of an extension service; and
storing the statistics in a system catalog for use by a query planner.

15. A computer program product, encoded on one or more non-transitory computer storage media, comprising instructions that when executed by one or more computers cause the one or more computers to perform operations comprising:

representing, by a first distributed system, as an external table, data stored in a second distributed system;

receiving, by a first master node of a first distributed system, a query that requests rows of data of the external table representing data stored in the second distributed system, wherein the first distributed system comprises the first master node and multiple segment nodes, wherein the first master node assigns each segment node to operate on a respective portion of data stored in the first distributed system, wherein the external table has an associated protocol that (i) is invoked when a segment node of the first distributed system receives a request from the first master node to access data represented by the external table and that (ii) causes the segment node to communicate with a segment extension service that provides direct streaming and conversion of data stored in the second distributed system, wherein the second distributed system is distinct from the first distributed system and comprises a second master node that coordinates requests among data nodes that each manage a different data fragment of data stored on the second distributed system, and wherein the segments nodes of the first distributed system are each operable to stream data in parallel from the second distributed system;

obtaining, by the first master node, statistics of the data stored in the second distributed system represented by the external table;

evaluating, by the first master node, a plurality of query plans using one or more cost criteria, including computing a cost associated with each of the query plans, wherein the cost criteria includes (i) a scanning cost of reading all the data stored in the second distributed system based on the statistics for broadcast to the segment nodes of the first distributed system, and (ii) a scanning cost of reading, from data nodes of the second distributed system in parallel, portions of the external table requested by segment nodes of the first distributed system;

selecting, by the first master node, a query plan from the plurality of query plans based at least in part on the cost associated with each of the query plans; and computing, by the first master node, a result for the received query according to the selected query plan.

16. The computer program product of claim 15, wherein obtaining, by the first master node, statistics of the data stored in the second distributed system represented by the external table comprises obtaining a number of fragments, rows, or blocks of data stored on the external system.

17. The computer program product of claim 15, wherein computing a cost associated with each of the query plans comprises using different cost criteria for scanning internal tables of data stored on the first distributed system than scanning external tables representing data stored on the second distributed system.

18. The computer program product of claim 15, wherein the one or more cost criteria include a measure of network bandwidth between the first distributed system and the second distributed system.

19. The computer program product of claim 15, wherein the second distributed system stores fragments of data in a second format that is different from a first format of a first table in the first distributed system.

20. The computer program product of claim 19, wherein the second distributed system is a NoSQL database.

21. The computer program product of claim 15, wherein the operations further comprise:
   receiving the statistics from an analyzer of an extension service; and
   storing the statistics in a system catalog for use by a query planner.

* * * * *